United States Patent [19]

Das et al.

[11] 4,177,178

[45] Dec. 4, 1979

[54] THERMOSETTING ACRYLIC COPOLYMER COMPOSITIONS

[75] Inventors: Suryya K. Das, Pittsburgh; Charles M. Kania, Tarentum, both of Pa.

[73] Assignee: PPG Industries, Inc., Pittsburgh, Pa.

[21] Appl. No.: 897,087

[22] Filed: Apr. 17, 1978

[51] Int. Cl.$^2$ .................. C08G 33/00; C08L 33/02; C08L 61/32; C08K 3/10

[52] U.S. Cl. .................. 260/29.40 A; 260/29.2 EP; 260/29.6 T; 260/29.6 TA; 260/39 M; 428/463; 526/287; 526/303; 526/317; 525/181; 525/183; 525/184; 525/420

[58] Field of Search .............. 260/29.40 A, 851, 854, 260/856, 855, 857 UN, 29.6 TA, 29.6 T, 29.2 EP, 836

[56] References Cited

U.S. PATENT DOCUMENTS

| | | | |
|---|---|---|---|
| 3,194,777 | 7/1965 | Christenson et al. | 260/31.8 |
| 3,238,168 | 3/1966 | Wolff et al. | 260/29.4 |
| 3,297,612 | 1/1967 | Lee et al. | 260/29.6 |
| 3,403,088 | 9/1968 | Hart | 204/181 |
| 3,862,071 | 1/1973 | DiCarlo | 260/29.40 A |
| 3,890,292 | 6/1975 | Bohme et al. | 260/31.4 R |
| 3,919,154 | 11/1975 | Chang et al. | 260/29.40 A |
| 3,953,644 | 4/1976 | Camelon et al. | 260/29.40 A |
| 3,970,628 | 7/1976 | Connelly et al. | 260/29.40 A |
| 3,991,028 | 11/1976 | Irwin et al. | 260/29.40 A |
| 4,066,583 | 1/1978 | Spaulding | 260/17.45 G |

OTHER PUBLICATIONS

Nakajima, "Adv in Chem. #125", ACS 1973, Fract of Linear PE with GPC, pp. 98-107.

*Primary Examiner*—Herbert J. Lilling
*Attorney, Agent, or Firm*—William J. Uhl

[57] ABSTRACT

Thermosetting acrylic copolymer compositions useful in coating applications are disclosed. The acrylic polymer has a weight average molecular weight of about 15,000 to 100,000 and contains from about 2 to 20 percent by weight of an alkyl ester of an unsaturated carboxylic acid containing from 14 to 20 carbon atoms in the alkyl group, for example, stearyl methacrylate. The compositions are particularly useful as water-based exterior coatings for automobiles and trucks.

6 Claims, No Drawings

4,177,178

THERMOSETTING ACRYLIC COPOLYMER COMPOSITIONS

BACKGROUND OF THE INVENTION

1. Field of the Invention

The present invention relates to thermosetting acrylic copolymer compositions for use in coating applications. More particularly, this invention relates to thermosetting acrylic compositions in which the acrylic copolymer contains active hydrogens and is in combination with a curing agent such as an amine-aldehyde condensate capable of reacting with the active hydrogens at elevated temperature to form a thermoset coating.

2. Brief Description of the Prior Art

Coating compositions based on acrylic polymers are well known in the art. The coatings are hard, curable and have excellent humidity resistance making them particularly desirable as exterior or topcoats for the automotive (including truck) market. Both thermoplastic and thermosetting acrylic polymers are employed for this use. However, for the automotive market, the acrylic polymers are organic solvent-based and present environmental problems with regard to solvent emissions. These problems can be overcome by using water-based acrylic polymers; but, until the present invention, water-based acrylics have not been considered acceptable for automotive topcoat applications. It had been thought that water-based acrylic polymers had poor rheological properties and had insufficient gloss and humidity resistance for automotive topcoat use. Surprisingly, it has been found that certain water-based acrylic polymers of a specific molecular weight range and prepared with a specific class of higher alkyl esters of alpha, beta-ethylenically unsaturated carboxylic acids can be used in aqueous-based thermosetting compositions for automotive topcoats. The resultant coating compositions have good rheological properties and sufficient gloss and humidity resistance for automotive usage. The thermosetting coating compositions of the present invention can be applied as aqueous-based compositions at high solids contents with good metallic pigment pattern control, gloss and distinctness of image (DOI).

SUMMARY OF THE INVENTION

The present invention provides for an improved thermosetting composition comprising an acrylic polymer containing active hydrogens selected from the class consisting of hydroxyl, primary amine, secondary amine, amido, thiol and carboxylic acid including mixed groups and a curing agent stable in the presence of the acrylic polymer at room temperature (i.e., 20°-25° C.) but reactive with the active hydrogens of the acrylic polymer at an elevated temperature to form a cured product. The improvement of the invention resides in using as the acrylic polymer one which has a weight average molecular weight of about 15,000 to 100,000, preferably 15,000 to 60,000, and which is prepared from copolymerizing with one or more different acrylic monomers 2 to 20 percent by weight of an alkyl ester of a copolymerizable alpha, beta-ethylenically unsaturated carboxylic acid containing from 14 to 20 carbon atoms in the alkyl group, preferably stearyl methacrylate.

The invention also provides for articles comprising a solid substrate having deposited thereon a cured thermosetting composition such as set forth above.

PERTINENT PRIOR ART

U.S. Pat. No. 3,194,777 to Christenson discloses organic solvent-based thermoplastic acrylic polymers having a molecular weight of about 87,000 to 150,000. The acrylic polymers are disclosed as being useful in automotive topcoat applications. The compositions are composed principally of methyl methacrylate in combination with a small amount of acrylic acid and an alkyl methacrylate containing from 8 to 18 carbon atoms in the alkyl chain such as stearyl methacrylate. The acrylic polymers of the present invention differ from those of Christenson in that they have a lower molecular weight, are thermosetting and can be used in water-based systems.

U.S. Pat. No. 3,297,612 to Lee et al relates to thermoplastic high molecular weight acrylic polymers prepared in latex form and containing stearyl methacrylate. The acrylic polymers of the present invention differ from those in Lee et al in that they are of lower molecular weight and are thermosetting in nature. In addition, it has been found that the $C_{14}$-$C_{20}$ alkyl esters of the alpha, beta-ethylenically unsaturated carboxylic acid prepared from a mixture of acrylic monomers including an alkyl acrylate or methacrylate containing from 1-18 carbon atoms in the alkyl chain such as stearyl methacrylate appear to function more effectively in the low molecular weight thermosetting systems of the present invention than in the high molecular weight latex products such as are described in the Lee et al reference.

U.S. Pat. No. 3,890,292 discloses thermoplastic water-dispersible acrylic polymers for use in adhesives. As such, when the adhesive is applied, it is tacky and water soluble. Water solubility is introduced into the polymer by using a fixed base, that is, an alkali metal salt of an alpha, beta-ethylenically unsaturated monocarboxylic acid and a polyalkylene oxide ester of an alpha, beta-ethylenically unsaturated monocarboxylic acid. The acrylic polymers of the present invention differ from those of U.S. Pat. No. 3,890,292 in that they are thermosetting in nature and when applied result in non-tacky, water-insoluble coatings.

U.S. Pat. No. 3,238,167 to Wolf discloses acrylic copolymers which are curable with amine-aldehyde condensates. The acrylic polymers are disclosed as being prepared in part from stearyl methacrylate. In addition, the acrylics of the U.S. Pat. No. 3,238,167 reference are high molecular weight emulsion polymerized latex products as opposed to the lower molecular weight solution polymerized products of the present invention. As pointed out above, it has been found that the $C_{14}$-$C_{20}$ esters of alpha, beta-ethylenically unsaturated carboxylic acids do not function as effectively in the high molecular weight emulsion polymerized latex products as they do in the low molecular weight solution polymerized products of the invention.

U.S. Pat. No. 3,403,088 to Hart discloses water-based compositions of acrylic copolymers in combination with amine-aldehyde condensate curing agents for use in electrodeposition. The acrylic polymers are broadly disclosed as being prepared in part from alkyl acrylates and methacrylates having up to 20 carbon atoms in the alkyl group. There is no teaching in the patent of any preference for $C_{14}$-$C_{20}$ alkyl esters of alpha, beta-ethylenically unsaturated carboxylic acids such as required by the present invention. In addition, the molecular weight of acrylic polymers disclosed by Hart is in general very low, that is, about 10,000 or less, which is necessary for electrodeposition applications.

U.S. Pat. No. 3,862,071 discloses water-based acrylic copolymers in combination with an amine-aldehyde curing agent. The acrylic copolymers are prepared by solution polymerization techniques and have relatively low molecular weights, that is, about 25,000 to 45,000. The compositions are disclosed as being useful as exterior finishes for automobile and truck bodies. However, there is no teaching in the reference of preparing the polymers with $C_{14}$–$C_{20}$ alkyl esters of alpha, beta-ethylenically unsaturated carboxylic acids such as required by the present invention.

DETAILED DESCRIPTION

The film-forming constituents of the thermosetting resinous composition of the present invention comprise an acrylic copolymer containing active hydrogens in combination with a curing agent which is reactive with the active hydrogens to form a cured product.

The acrylic copolymer which is used in the practice of the invention is prepared by free radical initiated polymerization of a mixture of copolymerizable acrylic monomers by solution polymerization techniques to a weight average molecular weight of about 15,000 to 100,000, preferably 15,000 to 60,000, and more preferably 18,000 to 40,000, as determined by gel permation chromatography using a polystyrene standard.

In measuring the weight average molecular weight using polystyrene as the standard, a Waters Associates Gel Permeation Chromatograph Model 201 was used. Four $\mu$-Styragel columns were used. Each column has the dimensions of 30 centimeters long and 7.8 millimeters inside diameter. A differential refractometer was used as the detector, and the columns were arranged according to their pore size on the order of $10^4$–$10^3$–500–100 Angstroms with the $10^4$ Angstrom column being the first one. Tetrahydrofuran was used as a solvent with a flow rate of 2.0 milliliters/minute. The quality of the columns is checked by their "theoretical plate number" determined from ortho-dichlorobenzene and those columns with theoretical plate numbers greater than 3000/30 cm. were used.

To determine molecular weight by gel permeation chromatography (GPC), the instrument is first calibrated using a polystyrene standard. The polystyrene standards used were purchased from Pressure Chemicals Company, Pittsburgh, Pennsylvania, and Waters Associates. Polystyrene standards have dispersities (dispersity=weight average molecular weight/number average molecular weight) ranging from 1.05 to 1.10. The weight average molecular weights of the polystyrene standards used were 2,000,000; 830,000; 451,000; 233,000; 110,000; 34,500; 20,000; 9,000; 4,000; 2,900. To obtain a calibration curve, a set of 1.0 percent (10 milligram polystyrene/1.0 ml. tetrahydrofuran) polystyrene solutions in tetrahydrofuran were prepared and a 0.2 ml. sample size was injected into the columns and a GPC chromatogram was obtained. The elution volume of each peak corresponding to a given molecular weight of the polystyrene standard was measured and the data was plotted on a semi-logarithmic paper (logarithm scale in the ordinate and a linear scale in the abscissa). A linear least squares plot of $\log_{10}$ (molecular weight) versus elution volume in milliliters is used as a calibration curve. The lowest molecular weight of the polystyrene standard used was 2900 and the calibration curve beyond that was extrapolated down to 100. The upper and lower exclusion limits of this set of columns are 450,000 and 100, respectively, in terms of the polystyrene molecular weight. The sample whose molecular weight averages are to be determined was prepared as a 1.0 percent tetrahydrofuran solution. After filtration to remove gel particles (if present), through a 0.5 micron MILLIPORE filter available from Millipore Corporation, Catalog No. FHLP01300, a 0.2 ml. sample size was injected into the columns and a GPC chromatogram obtained under the same experimental conditions as the calibration. The chromatogram is divided into vertical segments of equal elution volume approximately 1 milliliter and the height ($H_i$) of each segment and the corresponding molecular weight ($M_i$) obtained from the calibration curve are used to calculate the weight average molecular weight ($M_w$) according to the following equation:

$$M_w = \frac{\Sigma H_i M_i}{\Sigma H_i}$$

The mixture of acrylic polymers can be selected from a wide variety of polymerizable acrylic monomers. However, for exterior finishes for automobiles, trucks and the like, the mixture of polymerizable acrylic monomers is preferably selected from the following:

(A) 20 to 40, and preferably 25 to 35 percent by weight of a vinyl aromatic compound such as styrene, (B) 10 to 35, and preferably 15 to 30 percent by weight of an alkyl ester of methacrylic acid containing from about 1 to 3 carbon atoms in the alkyl group such as methyl methacrylate, (C) 15 to 40, and preferably 20 to 35 percent by weight of an alkyl ester of acrylic acid having 2 to 12 carbon atoms in the alkyl group such as 2-ethylhexyl acrylate or an alkyl ester of methacrylic acid containing from 4 to 12 carbon atoms in the alkyl group such as butyl methacrylate, or mixtures thereof.

(D) 2 to 20, and preferably 5 to 15 percent by weight of an acrylic monomer containing active hydrogens other than carboxylic acid groups such as a hydroxyalkyl acrylate or methacrylate, for example, hydroxypropyl acrylate, (E) 2 to 15, preferably 4 to 10 percent by weight of an alpha, beta-ethylenically unsaturated carboxylic acid such as acrylic acid.

Present with the mixture of monomers is from 2 to 20 and preferably 5 to 15 percent by weight of an alkyl ester of a copolymerizable alpha, beta-ethylenically unsaturated carboxylic acid containing from 14 to 20 carbon atoms in the alkyl group such as stearyl methacrylate.

The percentage by weight of the acrylic monomers presented above is based on total weight of the acrylic monomers and the above mixture of acrylic monomers constitutes at least 75 percent, preferably at least 85 percent, and most preferably 95 percent of the acrylic monomers used in preparing the acrylic polymer.

The vinyl aromatic compound provides so-called "hard segments" in the acrylic polymer chain and contributes hardness and gloss to the resultant thermosetting coating. The vinyl monomer also makes the acrylic polymer more compatible with an amine-aldehyde curing agent. Besides styrene which is the preferred vinyl aromatic monomer, other monovinyl aromatic monomers such as alpha-methyl styrene, tertiary butyl styrene, vinyl toluene and vinyl xylene can be used. Although the lower limit of styrene used is not particularly critical, the upper limit is somewhat important for automotive usage in that too much of the vinyl aromatic compound will result in insufficient durability, i.e., gloss retention for automotive use.

The alkyl ester of methacrylic acid containing from about 1 to 3 carbon atoms in the alkyl group provides hardness, durability and gloss retention to the resultant coating. If too much $C_1$ to $C_3$ alkyl methacrylate is used, the resultant coatings are too brittle for automotive usage. Use of too little $C_1$ to $C_3$ alkyl methacrylate generally results in insufficient gloss retention. Besides methyl methacrylate which is preferred, ethyl methacrylate can be used.

The alkyl ester of acrylic acid having from 2 to 12 carbon atoms in the alkyl group and the alkyl ester of methacrylic acid containing from 4 to 12 carbon atoms in the alkyl group provide relatively soft segments in the polymer chain which contributes flexibility to the acrylic polymer. If too much of either of these monomers is used, the resultant coatings are too soft and long-term durability suffers. Besides the 2-ethylhexyl acrylate and butyl methacrylate which are preferred, other soft acrylic monomers which can be used are ethyl acrylate, propyl acrylate, butyl acrylate, hexyl acrylate, hexyl methacrylate and 2-ethylhexyl methacrylate. These soft acrylic monomers can be used in admixture with one another.

The alpha, beta-ethylenically unsaturated carboxylic acid provides carboxyl groups which may act as curing sites or with water-based systems, provide sites of neutralization and solubilization. Typically useful acids besides the acrylic acid which is preferred are methacrylic acid, crotonic acid and itaconic acid.

In addition to the carboxylic acid-containing monomers mentioned immediately above, the monomer charge will usually always contain one or more polymerizable acrylic monomers containing active hydrogens selected from the class consisting of hydroxy, amido, primary amino, secondary amino and thiol, with the preferred active hydrogens being hydroxyl. These monomers provide active hydrogens which act as curing sites for the thermosetting compositions of the invention.

As mentioned above, polymerizable acrylic-containing monomers containing hydroxyl groups are preferred. Examples would include hydroxyalkly acrylates or methacrylates in which the hydroxyalkyl group contains from 2 to 4 carbon atoms such as hydroxyethyl acrylate, hydroxyethyl methacrylate, hydroxypropyl acrylate and hydroxypropyl methacrylate. Examples of other monomers which contain hydroxyl groups are those monomers containing N-methylol groups or alkylated derivatives thereof. Specific examples include N-methylol acrylamide and N-butoxymethyl acrylamide.

Examples of polymerizable acrylic monomers containing primary and secondary amino groups include 2-aminoethyl acrylate, 2-aminopropyl acrylate, 2-methylaminoethyl acrylate, 2-aminoethyl methacrylate, 3-aminopropyl methacrylate, 2,4-diaminobutyl methacrylate, 2-methylaminoethyl methacrylate and 2-aminoethyl ethacrylate.

Examples of polymerizable acrylic monomers containing amido groups are acrylamide, methacrylamide, ethacrylamide, alpha-chloro acrylamide, N-methyl acrylamide, N-ethyl acrylamide and N-methyl methacrylamide.

Examples of polymerizable acrylic monomers containing thiol groups are 2-mercapto ethyl acrylate, 3,5-dimercapto acrylate, 2-mercapto ethyl methacrylate, 3-mercapto propyl methacrylate and 2-mercapto ethyl ethacrylate.

The polymerizable acrylic monomers having active hydrogens may be used singularly or in admixture. Preferably, mixtures of acrylic monomers containing carboxylic acid groups and hydroxyl groups are used.

Besides the acrylic monomers mentioned above, the monomer charge will preferably also contain 0.1 to 5, preferably 0.1 to 3 percent by weight at least one ethylenicaly unsaturated sulfonic monomer represented by the formula:

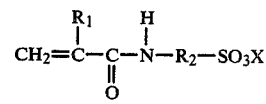

where $R_1$ is hydro, lower alkyl, lower cycloalkyl, phenyl, furfural, or halo; $R_2$ is a bivalent saturated hydrocarbon radical having its valence bond on different carbon atoms, and X is hydro, ammonium or amine. Examples of such compounds are disclosed in U.S. Pat. No. 4,008,293 to Maska and Hart. Preferably the ethylenically unsaturated sulfonic monomer is acrylamido propane sulfonic acid. Such monomers are usually employed when the acrylic polymer is combined with an amino-aldehyde curing agent. The presence of the sulfonic acid catalyzes the crosslinking reaction during baking and remains a part of the interpolymer.

The alkyl ester of acrylic or methacrylic acid containing from 14 to 20 carbon atoms in the alkyl group contributes to humidity resistance, gloss, distinctness of image and metallic pigment pattern control to resultant coatings. Use of less than the amounts recommended results in poor humidity resistance, lower distinctness of image and gloss, poorer flow and metallic pattern control. Furthermore, the films will be more prone to crater formation. Use of greater than the recommended amounts results in softer, less durable films with lower gloss and distinctness of image.

The preferred monomers are linear alkyl acrylates and methacrylates containing from 14 to 20 carbon atoms in the alkyl group such as stearyl methacrylate. Other monomers which can be used are stearyl acrylate, and the acrylates and methacrylates of myristic, palmitic and dodecanoic alcohols.

The acrylic polymer is prepared by conventional free radical initiated solution polymerization techniques in which the acrylic monomers are dissolved in a solvent or mixture of solvents and polymerized in the presence of a free radical initiator until the desired molecular weight is obtained.

Examples of free radical initiators are those which are soluble in the polymerization medium such as azobisisobutyronitrile, azobis(alpha, gammadimethylvalernitrile), tertiary-butyl perbenzoate, tertiary-butyl peracetate and benzoyl peroxide.

Optionally chain transfer agents such as alkyl mercaptans such as tertiary-dodecyl mercaptan; ketones such as methyl ethyl ketone, chlorohydrocarbons such as chloroform can be used.

Usually, the solvent is first heated to reflux and the mixture of acrylic monomers containing the free radical initiator added slowly to the refluxing solvent. After addition, additional catalyst is optionally added and the reaction mixture held at polymerizing temperatures so as to reduce the free monomer content of the reaction mixture.

For water-based compositions, water-miscible solvents are used in the polymerization. Examples include the monoalkyl ethers of ethylene glycol which contain from 1 to 4 carbon atoms in the alkyl group such as ethylene glycol monoethyl ether and ethylene glycol monobutyl ether. Examples of other suitable water-miscible solvents are isopropanol and diacetone alcohol. Mixtures of solvents including mixtures of water-miscible solvents with water can also be used.

For water-based compositions, the acrylic polymer is at least partially neutralized with a base such as an alkali metal hydroxide or preferably with an organic amine and then dispersed in water. Suitable amines are water-soluble amines including primary, secondary and tertiary amines including hydroxylamines. Examples include ethanolamine, diethanolamine, N-methylethanolamine, dimethylethanolamine, methylamine, ethylamine, diethylamine, trimethylamine, triethylamine, morpholine and ammonia. The acrylic polymer is neutralized to the extent of at least about 25 percent of the total theoretical neutralization and usually between about 40 to 70 percent of the total theoretical neutralization. Usually the pH of the final aqueous dispersion is adjusted to about 7 to 9.

After neutralization, the acrylic polymer is usually combined with a curing agent. The curing agent is one which is stable in the presence of the acrylic polymer at room temperature, that is, 20°–25° C., but reactive with the active hydrogens of the acrylic polymer at elevated temperature, that is, 200° C., to form a cured product. The preferred curing agents are water-soluble or water-dispersible aminoplasts.

The aminoplasts are aldehyde condensation products of melamine, benzoguanamine, urea or similar compounds. Generally, the aldehyde employed is formaldehyde, although useful products can be made from other aldehydes such as acetaldehyde, crotonaldehyde, acrolein, benzaldehyde, furfural and others. Condensation products of melamine, urea or benzoguanamine are the most common and are preferred but products of other amines and amides in which at least one amino group is present can also be employed. For example, such condensation products can be produced from various diazines, triazoles, guanidines, guanamines and alkyl and aryl di-substituted derivatives of such compounds including alkyl and aryl-substituted ureas and alkyl and aryl-substituted melamines and benzoguanamines. Some examples of such compounds are N,N-dimethyl urea, N-phenyl urea, dicyandiamide, formoguanamine, acetoguanamine, 6-methyl-2,4-diamino-1,3,5-triazine, 3,5-diaminotriazole, triaminopyrimidien, 3,5-diamino triazole, 4,6-diaminopyrimidine, 2,4,6-triethyltriamine-1,3,5-triazine and the like.

Thes aldehyde condensation products contain methylol groups or similar alkylol groups depending upon the particular aldehyde employed. If desired, these methylol groups can be etherified by reaction with an alcohol. Various alcohols are employed for this purpose including essentially any monohydric alcohol, although the preferred alcohols contain from 1 to 4 carbon atoms such as methanol, ethanol, isopropanol and n-butanol. The amine-aldehyde condensation products are produced in a manner well known in the art, using acidic or basic catalyst and varying compositions of time and temperature. The aldehyde is often employed as a solution in water or alcohol and the condensation, polymerization and etherification reactions may be carried out either sequentially or simultaneously.

The thermosetting resinous compositions of the present invention employ sufficient crosslinking agent such that when the resultant coating is baked at a temperature of about 250° to 325° F. (121° to 163° C.) for about 30 minutes, the resultant cured coating will be non-tacky and dry to the touch and be solvent resistant such that 15 xylene double rubs with an acetone-saturated cloth will not substantially soften nor remove the film from the substrate. Usually, the amount of crosslinking agent will constitute from about 2 to 40, and preferably from about 5 to 30 percent by weight of the thermosetting resinous composition based on total weight of the crosslinking agent and the acrylic polymer.

In addition to the amine-aldehyde condensates which are the preferred curing agents, examples of other curing agents can be polyepoxides. The polyepoxides can be used as curing agents when the source of active hydrogens is a carboxyl group or a primary or secondary amino or an amido group. Examples of suitable polyepoxide curing agents are described in U.S. Pat. No. 3,403,088 to Hart at column 4, line 32, continuing to column 6, line 20, the portions of which are hereby incorporated by reference.

Also, fully blocked isocyanate curing agents can be used as curing agents. Fully blocked isocyanates can be used when the curing groups are hydroxyl, thiol and primary and secondary amino. Examples of suitable fully blocked isocyanates are described in U.S. Pat. No. 3,984,299 to Jerabek in column 1, beginning at line 57, continuing through to column 3, line 15, the portions of which are hereby incorporated by reference.

For aqueous-based compositions, after the acrylic polymer and curing agent have been combined, the composition is usually thinned with deionized water to form the aqueous dispersion. The resin solids content of the resultant aqueous dispersion will vary depending somewhat on the acrylic polymer and the curing agent employed. Resin solids content of 20 to 60 percent by weight in aqueous medium can be employed. However, in general, for automotive use, resin solids content of about 25 to 40 percent, and preferably from about 28 to 32 percent in aqueous medium is usually employed. Solids contents of about this order are desirable for spraying applications in that they result in high film builds for each spray application. Also, solids contents within this range have been found to provide good rheological properties for flow and for metallic pattern pigment control.

The aqueous medium comprises from 40 to 80 percent by weight of the dispersion based on total weight of the resin solids and aqueous medium. For automotive use, the aqueous medium constitutes from 60 to 75 and preferably from 68 to 72 percent by weight of the dispersion based on total weight of the resin solids and aqueous medium. The aqueous medium consists of at least 40 percent, preferably at least 50 percent, and most preferably at least 70 percent by weight water with the remainder being organic solvent.

The thermosetting resinous compositions of the present invention are usually employed in paint compositions in which a percent of the resinous component additionally contains a pigment. The pigments may be any of the conventional types comprising, for example, iron oxides, lead oxides, strontium chromate, carbon black, coal dust, titanium dioxide, talc, barium sulfate as well as color pigments such as cadmium yellow, cadmium red, chromium yellow and the metallic pigments such as aluminum flake. The use of metallic pigments such as aluminum flake in combination with color pigments is particularly desirable in automotive exterior finish applications because of the lustrous metallic gloss which is obtained.

The pigment content of the paint is usually expressed as the pigment-to-resin weight ratio. In the practice of the present invention, the pigment-to-resin weight ratios are as high as 2:1 and, for most pigmented coatings, are within the range of 0.5 to 1:1.

In addition to the above ingredients, various fillers, plasticizers, anti-oxidants, ultraviolet light absorbers, flow control agents, surfactants and other formulating additives can optionally be employed if desired. These materials will generally constitute up to 25 percent by weight of the composition based on total solids.

Coating compositions of this invention can be applied to a variety of substrates such as wood, metal, glass, cloth, plastics, foams and the like by a variety of application techniques such as air spraying, airless spraying, electrostatic spraying, dipping, brushing, flow coating and the like.

The coating compositions of the invention can be applied over a primed metal substrate which is applied by electrodeposition techniques or can be applied by conventional spraying or dipping techniques. Also, the compositions can be used directly over the metal such as galvanized steel to form a durable coating.

The coatings are baked according to conventional procedures at about 200° to 400° F. (93° to 204° C.) and usually about 250° to 350° F. (121° to 177° C.) for about 5 to 60 minutes. The dry film thickness of the resultant coating will be about 0.5 to 5.0 and preferably about 1.0 to 2.5 mils in thickness.

Cured coatings prepared from the novel thermosetting compositions of the present invention have an outstanding finish which makes them particularly desirable for use as exterior coatings for automobile and truck applications. The finish is characterized by excellent metallic pigment pattern control, gloss, distinctness of image (mirror-like quality), humidity resistance, solvent resistance and general appearance including resistance to cratering and solvent popping.

The following examples illustrate the invention. All quantities are on a weight basis unless otherwise indicated.

EXAMPLE I

An acrylic polymer containing 5 percent by weight stearyl methacrylate was prepared from the following:

| Kettle Charge | |
|---|---|
| Ingredients | Parts by Weight |
| deionized water | 18.2 |
| butyl CELLOSOLVE[1] | 360.4 |

[1]Ethylene glycol monobutyl ether.

| Feed A | | |
|---|---|---|
| Ingredient | Parts by Weight | Percent by Weight |
| styrene | 290.2 | 30 |
| methyl methacrylate | 212.8 | 22 |
| butyl methacrylate | 179.0 | 18.5 |
| 2-ethylhexyl acrylate | 7.1 | 9.0 |

-continued

| Feed A | | |
|---|---|---|
| Ingredient | Parts by Weight | Percent by Weight |
| stearyl methacrylate | 48.4 | 5.0 |
| hydroxypropyl acrylate | 91.9 | 9.5 |
| acrylic acid | 58.0 | 6.0 |
| azobisisobutyronitrile[1] | 8.4 | 0.85 |

[1]Commercially available from E.I. duPont de Nemours under the trademark VAZO.

| Feed X | |
|---|---|
| Ingredient | Parts by Weight |
| acrylamido propane sulfonic acid (AMPS) | 4.9 (0.5%)[1] |
| deionized water | 21.8 |
| dimethyl ethanolamine | sufficient to adjust pH to 7-8 |

[1]Based on total weight of acrylic monomers.

| Feed B | |
|---|---|
| Ingredient | Parts by Weight |
| butyl CELLOSOLVE | 15.6 |
| tert-butyl perbenzoate | 1.0 |

| Feed C | |
|---|---|
| Ingredient | Parts by Weight |
| dimethyl ethanolamine | 43.6 |

| Feed D | |
|---|---|
| Ingredient | Parts by Weight |
| amine-aldehyde condensate[1] | 243 |

[1]Partially butylated melamine-formaldehyde condensate commercially available from Monsanto Chemical Company under the trademark RESIMENE R-755.

| Feed E | |
|---|---|
| deionized water | 2133.1 |

The kettle charge was added to a reaction vessel and heated to reflux at about 120° C. under a nitrogen atmosphere. Feed A and Feed X were then added continuously and simultaneously to the reactor over a period of about 3 hours with the temperature being maintained between 111°–118° C. Feed B was added slowly over a 2-hour period with the temperature being maintained at about 113° C. The reaction mixture was then digested for about one hour at 114° C., cooled to 100° C. and then neutralized to 60 percent total theoretical neutralization with dimethyl ethanolamine. The amine-aldehyde condensate was then added to the reaction mixture (80 percent acrylic/20 percent amine-aldehyde condensate) and the reaction mixture thinned with deionized water and filtered through cheesecloth to remove gel particles.

The aqueous dispersion had a solids content of about 30.4 percent (theoretical solids 31.97 percent), a pH of 7.95 and a Brookfield viscosity of 150 centipoises measured at 22° C. with a No. 1 spindle at 20 revolutions per minute (rpm).

The acrylic polymer had a weight average molecular weight of about 21,000.

EXAMPLE II

An acrylic polymer similar to that of Example I was prepared with the exception that dibutyl itaconate was included in the monomer charge instead of butyl methacrylate. The various feeds were as follows:

| Kettle Charge | |
|---|---|
| Ingredients | Parts by Weight |
| deionized water | 18.6 |
| butyl CELLOSOLVE | 360.4 |

| Feed A | | |
|---|---|---|
| Ingredients | Parts by Weight | Percent by Weight |
| styrene | 290.2 | 30 |
| methyl methacrylate | 212.8 | 22 |
| dibutyl itaconate | 179.0 | 18.5 |
| 2-ethylhexyl acrylate | 87.1 | 9.0 |
| stearyl methacrylate | 48.7 | 5.0 |
| hydroxypropyl acrylate | 91.9 | 9.5 |
| acrylic acid | 58.0 | 6.0 |
| VAZO | 8.4 | 0.85 |

| Feed X | |
|---|---|
| Ingredients | Parts by Weight |
| AMPS | 4.9 (0.5%) |
| deionized water | 21.8 |
| dimethyl ethanolamine | pH = 7–8 |

| Feed B | |
|---|---|
| Ingredients | Parts by Weight |
| butyl CELLOSOLVE | 15.6 |
| tert-butyl perbenzoate | 1.0 |

| Feed C | |
|---|---|
| dimethyl ethanolamine | 43.6 (60% total theoretical neutralization) |

| Feed D | |
|---|---|
| amine-aldehyde condensate of Example I[1] | 243.0 |

[1] 20 percent amine-aldehyde condensate/80 percent acrylic.

| Feed E | |
|---|---|
| deionized water | 2133.1 |

Polymerization and dispersion were accomplished as generally described in Example I. The acrylic polymer had a weight average molecular weight of about 25,000. The final dispersion had a solids content of 30.1 percent (theoretical solids 31.9 percent), a pH of 7.6 and a Brookfield viscosity of 160 centipoises at 22° C. with a No. 1 spindle at 20 rpm's.

EXAMPLES III–VI

The following examples show the preparation of various acrylic polymers and aqueous dispersions thereof which were prepared in a manner similar to that of Example I with the exception that higher levels of stearyl methacrylate are employed.

EXAMPLE III

The following example shows the preparation of an acrylic polymer containing 10 percent stearyl methacrylate and the aqueous dispersion thereof. The various feeds are as follows:

| Kettle Charge | |
|---|---|
| Ingredients | Parts by Weight |
| deionized water | 18.2 |
| butyl CELLOSOLVE | 360.4 |

| Feed A | | |
|---|---|---|
| Ingredients | Parts by Weight | Percent by Weight |
| styrene | 290.2 | 30.0 |
| methyl methacrylate | 188 | 19.5 |
| butyl methacrylate | 154.8 | 16.0 |
| 2-ethylhexyl acrylate | 87.1 | 9.0 |
| stearyl methacrylate | 96.7 | 10.0 |
| hydroxypropyl acrylate | 91.9 | 9.5 |
| acrylic acid | 58.0 | 6.0 |
| VAZO | 8.4 | 0.85 |

| Feed X | |
|---|---|
| Ingredient | Parts by Weight |
| AMPS | 4.9 (0.5%) |
| deionized water | 21.8 |
| dimethyl ethanolamine | pH = 7–8 |

| Feed B | |
|---|---|
| Ingredients | Parts by Weight |
| butyl CELLOSOLVE | 15.6 |
| tert-butyl perbenzoate | 1.0 |

| Feed C | |
|---|---|
| dimethyl ethanolamine | 43.6 (60% total theoretical neutralization) |

| Feed D | |
|---|---|
| amine-aldehyde condensate of Example I[1] | 243 |

[1] 20 percent by weight amine-aldehyde condensate/80 percent by weight acrylic.

| Feed E | |
|---|---|
| deionized water | 2133.1 |

Polymerization and dispersion were accomplished as generally described in Example I. The acrylic polymer had a weight average molecular weight of about 21,000.

The final aqueous dispersion had a solids content of 28.8 percent (theoretical total solids 31.9 percent), a pH of 7.6, and a Brookfield viscosity of 405 centipoises measured at 22° C. with a No. 1 spindle at 20 rpm's.

EXAMPLE IV

The following example also shows the preparation of an acrylic polymer containing 10 percent by weight stearyl methacrylate and the aqueous dispersion thereof. The various feeds are as follows:

| Kettle Charge | |
|---|---|
| Ingredients | Parts by Weight |
| deionized water | 19.0 |
| butyl CELLOSOLVE | 188.4 |
| Feed A | 256.7 (25% by weight of Feed A) |

| Feed A | | |
|---|---|---|
| Ingredients | Parts by Weight | Percent by Weight |
| styrene | 303.5 | 30 |
| butyl acrylate | 141.6 | 14 |
| butyl methacrylate | 136.5 | 13.5 |
| stearyl methacrylate | 101.2 | 10.0 |
| methyl methacrylate | 172 | 17 |
| hydroxypropyl acrylate | 96.1 | 9.5 |
| acrylic acid | 60.7 | 6 |
| VAZO | 8.8 | 0.85 |

| Feed X | |
|---|---|
| Ingredients | Parts by Weight |
| AMPS | 5.1 (0.5%) |
| deionized water | 22.8 |
| dimethyl ethanolamine | pH = 7.8 |

| Feed B | |
|---|---|
| Ingredients | Parts by Weight |
| tert-butyl perbenzoate | 1.0 |
| butyl CELLOSOLVE | 16.2 |

| Feed C | |
|---|---|
| dimethyl ethanolamine | 45.0 (60% total theoretical neutralization) |

| Feed D | |
|---|---|
| amine-aldehyde condensate of Example I[1] | 257.3 |

[1]20 percent by weight amine-aldehyde condensate/80 percent by weight acrylic.

| Feed E | |
|---|---|
| deionized water | 2104.9 |

The kettle charge which includes 25 percent by weight of Feed A was charged to a reaction vessel under a nitrogen atmosphere and heated to reflux at a temperature of about 210° F. (99° C.). The remaining portion of Feed A and Feed X were charged simultaneously and continuously to the reactor as generally described in the procedure of Example I. The additional Feeds B through E were also charged as generally described in Example I to produce an aqueous dispersion having a solids content of 32 percent (total theoretical solids 34.7 percent), a pH of 8.2, and a Gardner-Holdt letter viscosity of about X-Y. The acrylic polymer had a weight average molecular weight of about 22,000.

EXAMPLE V

The following example shows the preparation of an acrylic polymer containing 20 percent by weight stearyl methacrylate and the aqueous dispersion thereof. The various feeds are as follows:

| Kettle Charge | |
|---|---|
| Ingredient | Parts by Weight |
| deionized water | 18.2 |
| butyl CELLOSOLVE | 360.4 |

| Feed A | | |
|---|---|---|
| Ingredient | Parts by Weight | Percent by Weight |
| styrene | 290.2 | 30 |
| methyl methacrylate | 246.7 | 25.5 |
| stearyl methacrylate | 193.4 | 20.0 |
| 2-ethylhexyl acrylate | 87.1 | 9.0 |
| hydroxypropyl acrylate | 91.9 | 9.5 |
| acrylic acid | 58.1 | 6.0 |
| VAZO | 8.4 | 0.85 |

| Feed X | |
|---|---|
| Ingredients | Parts by Weight |
| AMPS | 4.9 (0.5%) |
| deionized water | 21.8 |
| dimethyl ethanolamine | pH = 7-8 |

| Feed B | |
|---|---|
| Ingredients | Parts by Weight |
| butyl CELLOSOLVE | 15.6 |
| tert-butyl perbenzoate | 1.0 |

| Feed C | |
|---|---|
| dimethyl ethanolamine | 43.6 (60% total theoretical neutralization |

| Feed D | |
|---|---|
| amine-aldehyde condensate of Example I[1] | 243.0 |

[1]20 percent by weight amine-aldehyde condensate/80 percent by weight acrylic.

| Feed E | |
|---|---|
| deionized water | 2133.1 |

Polymerization and dispersion were accomplished as generally described in Example I. The acrylic polymer had a weight average molecular weight of about 23,000. The final aqueous dispersion had a total solids content of 31.6 percent (theoretical total solids of 31.9 percent), a pH of 7.6 and a Brookfield viscosity of 322.5 centipoises measured at 22° C. with a No. 1 spindle at 20 rpm's.

EXAMPLE VI

The following example shows the preparation of an acrylic polymer with 20 percent by weight stearyl methacrylate. The feeds for preparing the polymer in the aqueous dispersion are as follows:

| Kettle Charge | |
|---|---|
| Ingredients | Parts by Weight |
| deionized water | 18.2 |
| butyl CELLOSOLVE | 360.4 |

| Feed A | | |
|---|---|---|
| Ingredients | Parts by Weight | Percent by Weight |
| styrene | 290.2 | 30 |
| methyl methacrylate | 188.6 | 19.5 |
| butyl methacrylate | 58.1 | 6.0 |
| stearyl methacrylate | 193.4 | 20.0 |
| 2-ethylhexyl acrylate | 87.1 | 9.0 |
| hydroxypropyl acrylate | 91.9 | 9.5 |
| acrylic acid | 58.0 | 6.0 |
| VAZO | 8.4 | 0.85 |

| Feed X | |
|---|---|
| Ingredient | Parts by Weight |
| AMPS | 4.9 (0.5%) |
| deionized water | 21.8 |
| dimethyl ethanolamine | pH = 7-8 |

| Feed B | |
|---|---|
| Ingredient | Parts by Weight |
| butyl CELLOSOLVE | 15.6 |
| tert-butyl perbenzoate | 1.0 |

| Feed C | |
|---|---|
| dimethyl ethanolamine | 43.6 (60% total theoretical neutralization) |

| Feed D | |
|---|---|
| amine-aldehyde condensate of Example I[1] | 243.0 |

[1]20 percent by weight amine-aldehyde condensate/80 percent by weight acrylic.

| Feed E | |
|---|---|
| deionized water | 2133.1 |

Polymerization and dispersion were accomplished as generally described in Example I.

The acrylic polymer had a weight average molecular weight of about 22,000. The final aqueous dispersion had a total solids of 30.6 percent (theoretical total solids 31.01 percent), a pH of 8 and a Brookfield viscosity of 2650 centipoises measured at 22° C. with a No. 4 spindle at 20 rmp's.

EXAMPLE VII

An organic solvent-based acrylic polymer containing 5.0 percent by weight stearyl methacrylate was prepared from the following:

| Kettle Charge | |
|---|---|
| Ingredient | Parts by Weight |
| toluene | 975.0 |
| butanol | 375.2 |

| Feed A | | |
|---|---|---|
| Ingredient | Parts by Weight | Percent by Weight |
| methyl methacrylate | 463.5 | 30.9 |
| butyl methacrylate | 450.0 | 30.0 |
| 2-ethylhexyl acrylate | 372.0 | 24.8 |
| stearyl methacrylate | 75.0 | 5.0 |
| acrylamide | 45.0 | 3.0 |
| methacrylic acid | 49.5 | 3.3 |
| hydroxypropyl acrylate | 45.0 | 3.0 |
| VAZO | 15.0 | 1.0 |
| butanol | 75.0 | — |
| t-dodecyl mercaptan | 7.5 | — |

| Feed B | |
|---|---|
| Ingredient | Parts by Weight |
| toluene | 75.0 |
| t-butyl perbenzoate | 7.5 |

The kettle charge is added to a reaction vessel and heated to reflux at about 104° C. under a nitrogen atmosphere. Feed A was added continuously to the reactor over a period of about 3 hours with the temperature being maintained between 104°-108° C. Feed B was added slowly over a 2-hour period with the temperature being maintained at about 108° C. After the completion of Feed B, the reaction mixture was then heated for an additional two hours at 108° C., cooled to room temperature at about 25° C. and then filtered through a nylon bag to remove gel particles. The polymer had a solids content of about 50 percent by weight and a weight average molecular weight of about 80,000. The acrylic polymer was then combined with the partially butylated melamine-formaldehyde condensate of Example I (80 percent acrylic/20 percent amine-aldehyde condensate) to form a thermosetting resinous composition.

We claim:

1. In an aqueous thermosetting resinous coating composition of a dispersed acrylic copolymer containing active hydrogens selected from the class consisting of hydroxyl, primary amine, secondary amine, amido, thiol and carboxylic acid, and a curing agent stable in the presence of said acrylic polymer at room temperature but reactive with the active hydrogens of the acrylic polymer at an elevated temperature to form a cured product, the improvement comprising:

an at least partially base neutralized acrylic polymer which has a weight average molecular weight of about 15,000 to 100,000, as determined by gel permeation chromatography using a polystyrene standard, and which is prepared from copolymerizing in the presence of a free radical initiator:
(A) 20 to 40 percent by weight of a vinyl aromatic compound,
(B) 10 to 35 percent by weight of an alkyl ester of methacrylic acid having 1 to 3 carbon atoms in the alkyl group,
(C) 15 to 40 percent by weight of an alkyl ester of acrylic acid having 2 to 12 carbon atoms in the alkyl group or an alkyl ester of methacrylic acid having 4 to 12 carbon atoms in the alkyl group,
(D) 2 to 20 percent by weight of an acrylic monomer containing active hydrogens selected from the class consisting of hydroxyl, primary amine, secondary amine, amido and thiol,
(E) 2 to 15 percent by weight of an alpha, beta-ethylenically unsaturated carboxylic acid,
(F) 2 to 20 percent by weight of an alkyl ester of an alpha, beta-ethylenically unsaturated carboxylic acid having 14 to 20 carbon atoms in the alkyl group, the percentage by weight of the acrylic monomers presented above being based on total weight of acrylic monomers; said coating composition containing from 20 to 60 percent by weight resin solids.

2. The thermosetting dispersion of claim 1 in which the alkyl ester (F) is selected from the class consisting of alkyl acrylate, alkyl methacrylate and mixtures thereof.

3. The thermosetting dispersion of claim 1 in which the alkyl group of (F) contains from 16 to 18 carbon atoms.

4. The thermosetting dispersion of claim 3 in which the alkyl group is stearyl.

5. The thermosetting dispersion of claim 1 in which the active hydrogens are selected from the class consisting of hydroxyl, carboxylic acid and mixed groups.

6. The thermosetting dispersion of claim 1 in which the curing agent is an amine-aldehyde condensate.

* * * * *